United States Patent
Pettiross et al.

(10) Patent No.: US 7,336,828 B2
(45) Date of Patent: Feb. 26, 2008

(54) MULTIPLE HANDWRITING RECOGNITION ENGINE SELECTION

(75) Inventors: Jeffrey W. Pettiross, Seattle, WA (US); William H. Vong, Seattle, WA (US); William Mak, Seattle, WA (US); Joshua Clow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/622,833

(22) Filed: Jan. 12, 2007

(65) Prior Publication Data

US 2007/0110315 A1 May 17, 2007

Related U.S. Application Data

(62) Division of application No. 10/401,744, filed on Mar. 31, 2003, now Pat. No. 7,187,801.

(51) Int. Cl.
*G06K 9/00* (2006.01)

(52) U.S. Cl. .................... 382/187; 345/179

(58) Field of Classification Search ............ 382/181, 382/186–189, 209; 715/863–864; 345/156, 345/171, 172, 179
See application file for complete search history.

(56) References Cited

U.S. PATENT DOCUMENTS

| | | | |
|---|---|---|---|
| 5,252,951 A * | 10/1993 | Tannenbaum et al. ....... 345/156 |
| 5,615,284 A | 3/1997 | Rhyne et al. |
| 5,633,957 A * | 5/1997 | Robinson .................... 382/292 |
| 5,717,939 A | 2/1998 | Bricklin et al. |
| 5,841,901 A | 11/1998 | Arai et al. |
| 5,848,187 A * | 12/1998 | Bricklin et al. ............. 382/187 |
| 6,661,920 B1 | 12/2003 | Skinner |

* cited by examiner

*Primary Examiner*—Daniel Mariam
(74) *Attorney, Agent, or Firm*—Birch, Stewart, Kolasch & Birch, LLP

(57) ABSTRACT

A system and method for switching between handwriting recognizers is described. A user may select between various recognizers to associate received handwritten ink with the recognizers. Accordingly, a user is able to write in a first language, switch and write in a second language, then switch again and write in the first language using aspects of the present invention.

16 Claims, 7 Drawing Sheets

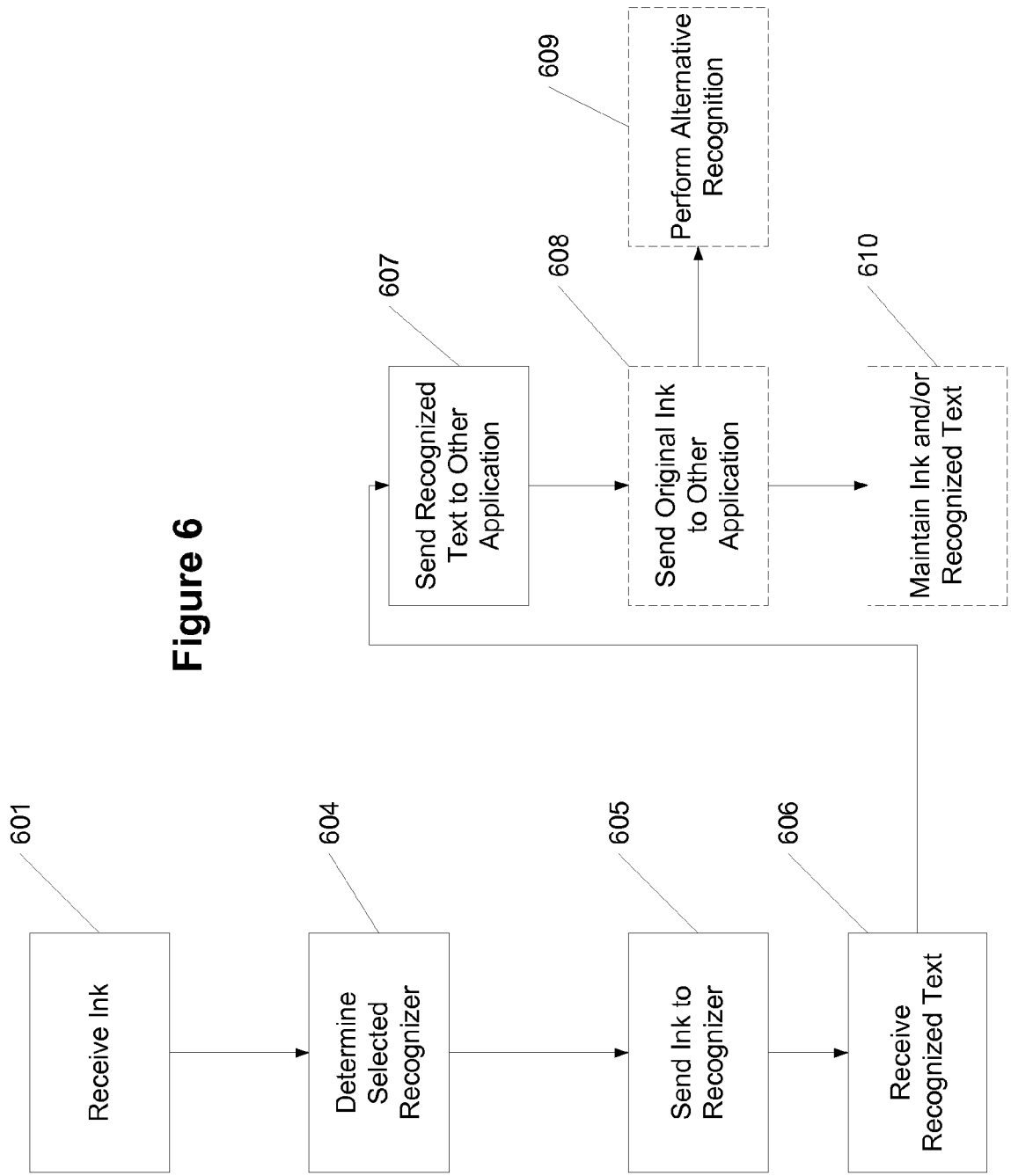

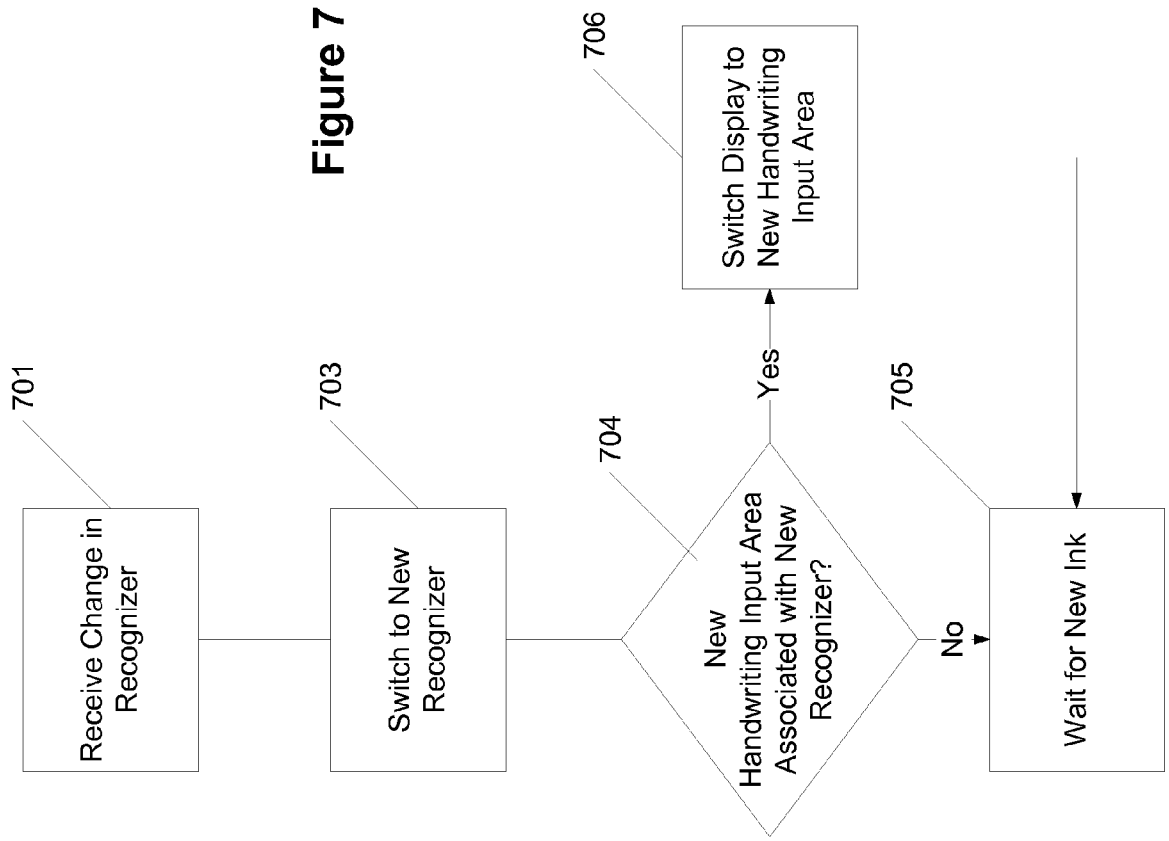

MULTIPLE HANDWRITING RECOGNITION ENGINE SELECTION

CROSS-REFERENCE TO RELATED APPLICATIONS

This application is a divisional of prior U.S. application Ser. No. 10/401,744, filed Mar. 31, 2003 which is now U.S. Pat. No. 7,187,801, the entire contents of which are incorporated herein by reference.

TECHNICAL FIELD

In general, aspects of the present invention relate to electronic ink. More particularly, aspects of the present invention relate to selecting among multiple handwriting recognition engines.

BACKGROUND

Typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Computer users may switch between languages associated with their user interface. This means that dialog boxes, buttons, menu items, taskbar items and the like may have various representations that conform to a selected language. For example if a user switches from English to French, as the desired language for a user interface, then various portions of the user interface may be modified to reflect this change. This ability to switch between languages for a user is due to the fact that many users are fluent in more than one language. In some cases, terms or expressions cannot be expressed in a first language and instead the user desires to express them in another language.

In a stylus-based input system, users may create electronic ink and have that ink recognized by a handwriting recognition application. In these stylus-based input systems, switching between languages is cumbersome. This difficulty arises not necessarily in the pathway used to make a change, but in the number of steps required to make the change multiplied by the number of times one would change between languages. For example a person may be writing in English using a stylus then switch to Japanese to write a phrase then switch back to English. This change between languages can become cumbersome and distracting to users when the users' concentration is directed to the creation of the electronic ink, rather than the steps required to switch between languages. Accordingly, an improved approach is needed to permit easy switching between recognizers to be associated with received handwriting.

SUMMARY

Aspects of the present invention are directed to solving one or more problems as mentioned above, thereby providing a way for users to quickly select an appropriate handwriting recognizer for recognition of electronic ink. In some aspects of the present invention, a user may switch between recognizers by writing in different areas of a user interface. The user interface may provide the different writing areas by providing selectable tabs, with the selection of each tab displaying a handwriting input area These and other aspects are addressed in relation to the Figures and related description.

BRIEF DESCRIPTION OF DRAWINGS

The foregoing summary of aspects of the invention, as well as the following detailed description of various embodiments, is better understood when read in conjunction with the accompanying drawings, which are included by way of example, and not by way of limitation with regard to the claimed invention.

FIG. 6 shows a process for handling electronic ink and multiple recognizers in accordance with embodiments of the present invention.

FIG. 7 shows a process for switching between recognizers in accordance with embodiments of the present invention.

DETAILED DESCRIPTION OF DRAWINGS

Figure 1:
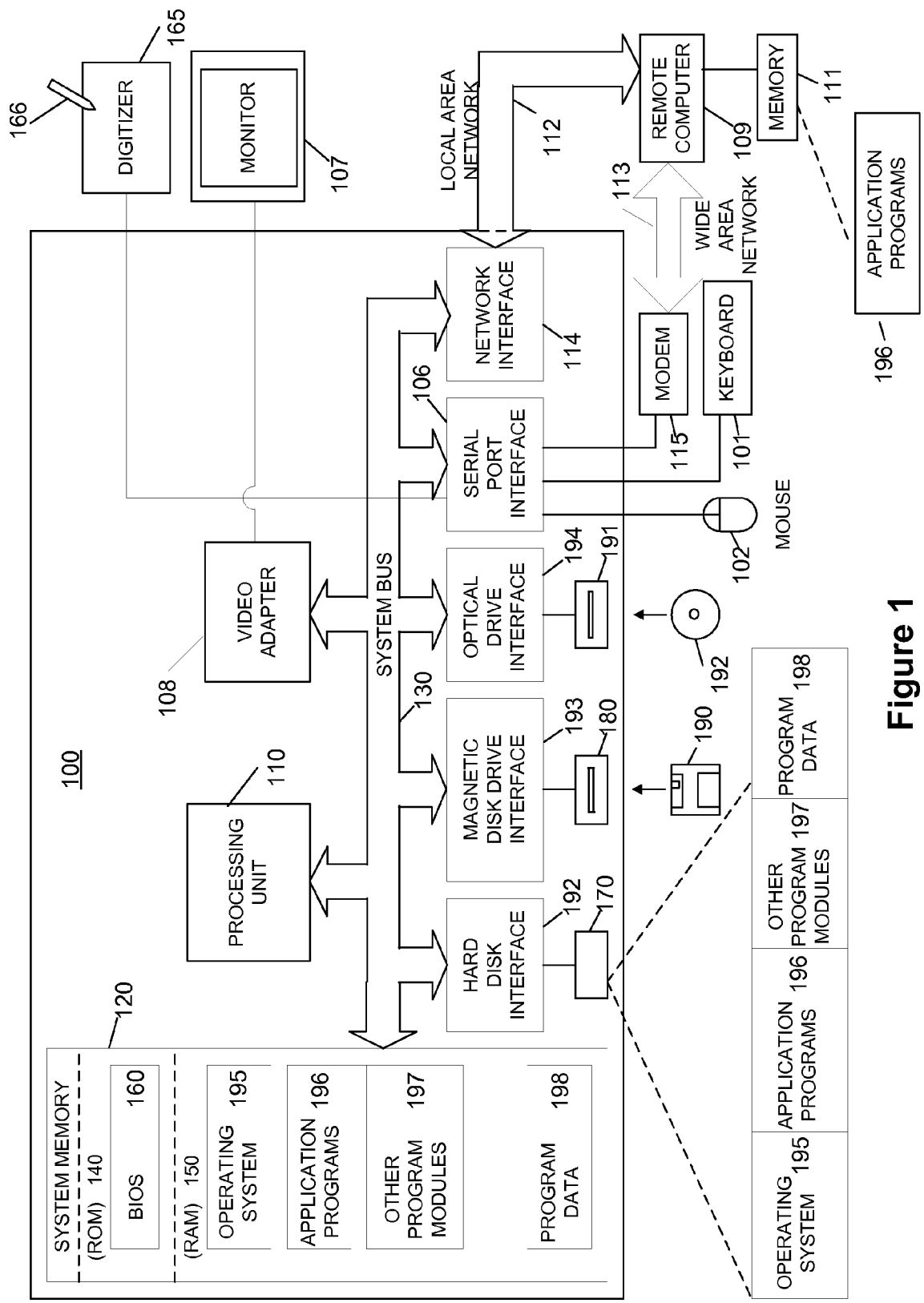
FIG. 1 shows a general-purpose computer supporting one or more aspects of the present invention.

Aspects of the present invention provide one or more ways for users to quickly select an appropriate handwriting recognizer for recognition of electronic ink. Aspects of the present invention also relate to the switching among multiple handwriting recognition engines, thereby providing a user with an easy-to-use yet robust interface for associating ink with various recognition engines. In some aspects of the present invention, a user may switch between recognizers by writing in different areas of a user interface. The user interface may provide the different writing areas by providing selectable tabs, where the selection of each tab displays a handwriting input area. In other aspects of the present invention, a user may select an input language and have a recognizer associated with the input language be designated as the recognizer to recognize received ink. Aspects of the present invention may be used with a standard personal computer having a mouse and keyboard. Also, aspects of the present invention may be used with a stylus-based computing system (which may or may not have a mouse (or trackball or touch pad) and a keyboard).

The following description is separated into various subheadings in order to assist of the user in understanding the various aspects of the present invention. These headings include: characteristics of ink; terms; general-purpose computer; user interfaces displaying alternate handwriting recognition engines; and processes for switching between and applying selected multiple handwriting recognition engines.

Characteristics of Ink

Electronic ink (or ink) refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General-Purpose Computer

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
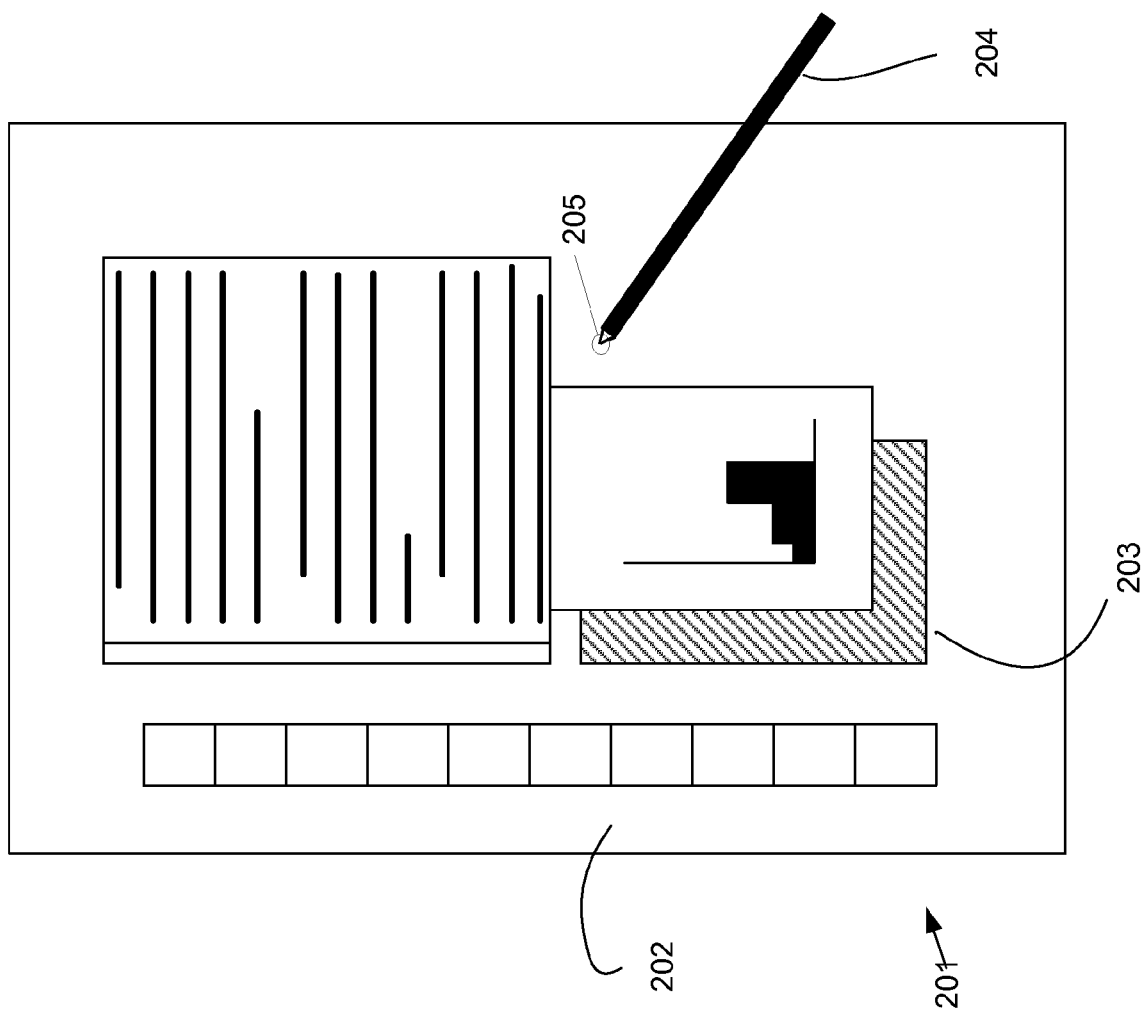
FIG. 2 shows a display for a stylus-based input system according to aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

User Interfaces Displaying Alternate Handwriting Recognition Engines

Figure 3:
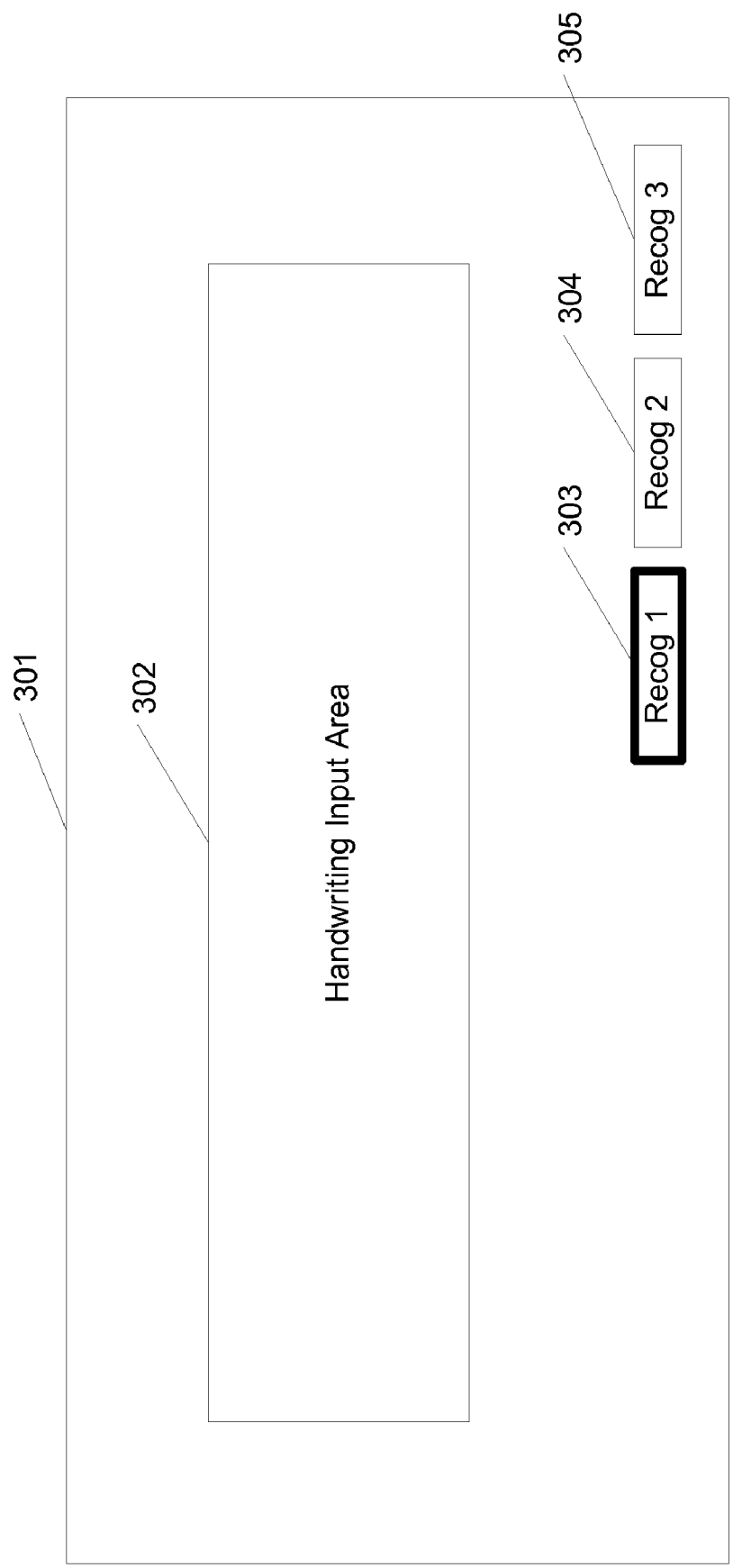
FIG. 3 shows a first user interface for selecting among multiple handwriting recognition engines in accordance with embodiments of the present invention.

FIG. 3 shows a first user interface for selecting among multiple handwriting recognition engines in accordance with embodiments of the present invention. FIG. 3 shows a user interface 301 having a handwriting input area 302. User interface 301 also includes three clickable regions 303, 304, and 305. Each of these regions activates a different recognizer. For instance, selecting region 303 associates recognizer Recog 1 with received ink, selecting region 304 associates recognizer Recog 2 with received ink, and selecting region 305 associates recognizer Recog 3 with received ink. Here, for example, the received ink may be ink written in handwriting input area 302. The recognizers available on the user system may be displayed as selectable options. Alternatively, less than all available recognizers may be provided as options (for example, where the numbers of available recognizers is high and would clutter the user interface—in which instance the most recently used or most popular recognizers may be related to the displayed regions). Further, additional recognizers not available on the users system may also be provided (for example, where these recognizers are known to exist yet are not currently available on a user's system). In this latter example, the identity of a recognizer may be associated with captured ink, but recognition of the content of the ink may be delayed until the recognizer is associated with the captured ink is available. Here, clickable regions 303-305 are shown as buttons. They may also be shown as radio buttons, tabs, dropdown menu selections, check boxes, and the like.

The association of ink with a handwriting recognizer may have two or more results. For example, the ink may be stored with the identification of a handwriting recognizer (in this example, Recog 1, Recog 2, or Recog 3). Alternatively, the ink may be processed by the designated handwriting recognizer (Recog 1, Recog 2, or Recog 3) and the recognized text or the recognized text and the original ink outputted.

When user interface 301 is used in conjunction with a document, drawing, form, or the like (or any document to receive electronic ink or recognized text), a recognition result stemming from the processing of the received electronic ink by a recognition engine may be returned to the document. For example, if a user is filling out a form and encounters a field needing an address, the user may open user interface 301 or it may open upon selection of the field. Next, the user may enter some information and have that information associated with the first recognizer Recog 1, then switch recognizers by selecting buttons 304 or 305, and have later entered information associated with the selected recognizer. Finally, this information may be then entered into the selected field.

The recognizers associated with buttons 303-305 may include recognizers of the various languages of the world including, but not limited to, English, Japanese, German, French, Finnish, Spanish, and the like. This list of languages may also include complex script languages as well, including Arabic, Hindi, and Thai, and a Cyrillic-based language like Russian. Further, different recognizers may be provided for each language. For example, English may have both US English and UK English (which differ in the lexicons, letter shapes, and other material ways, but still apply to the English language) recognizers associated with it. In this example, these two variations of Chinese may have different buttons associated with them. Further, aspects of the present invention may include all of the recognizers described or may only have subsets of them locally stored. So, for example if a user only speaks French, German, and English, the user may only have purchased these recognizers or have had these recognizers placed on his or her machine.

Figure 4:
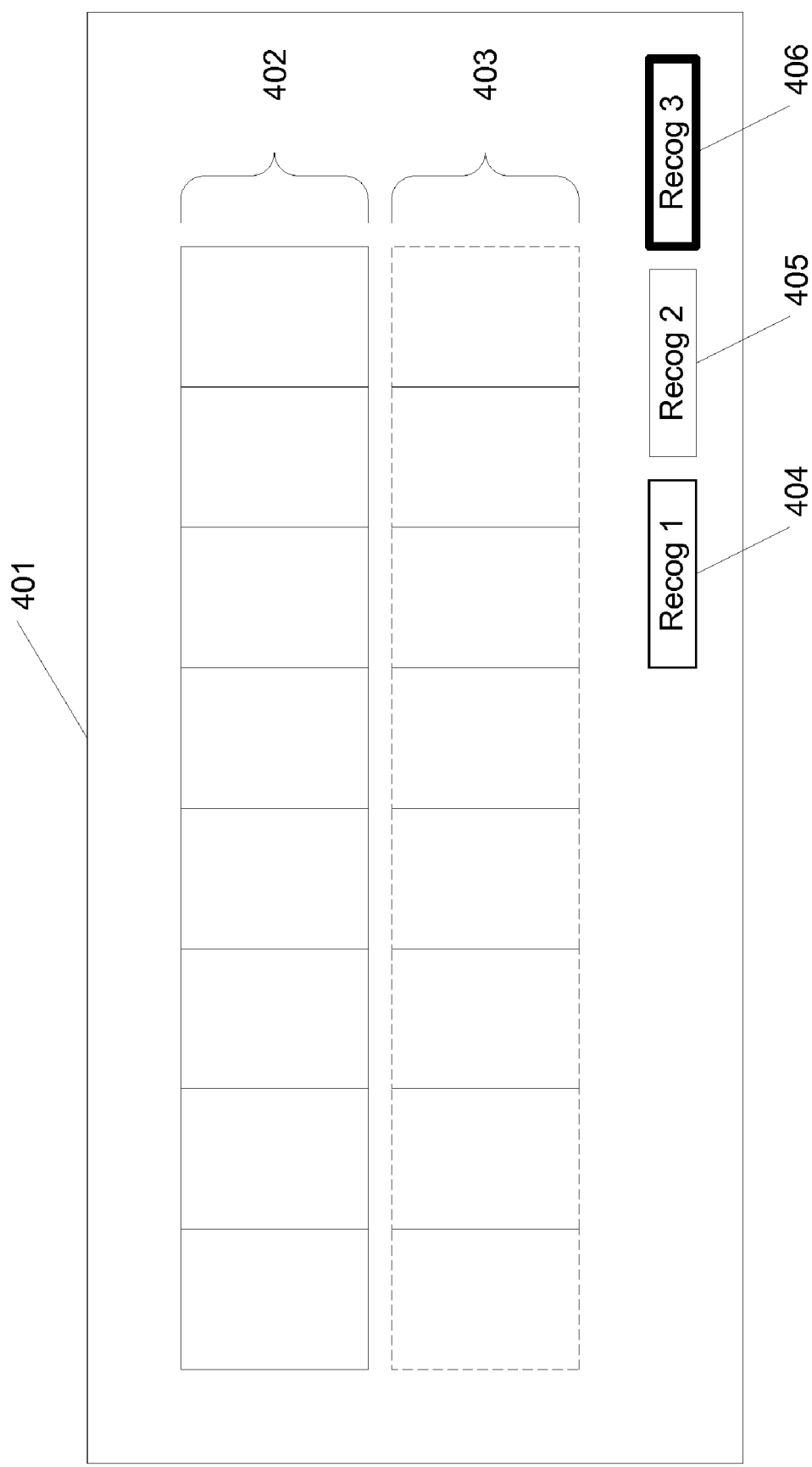
FIG. 4 shows a second user interface for selecting among multiple handwriting recognition engines in accordance with embodiments of the present invention.

FIG. 4 shows a second user interface for selecting among multiple handwriting recognition engines in accordance with embodiments of the present invention. FIG. 4 includes user interface 401 having boxed input area 402 having at least two boxes for receiving characters. This boxed input display is useful when inputting characters in a non-connected fashion, like printed instead of cursive English handwriting. Boxes are a useful input mechanism in many (if not all) languages, particularly when a language model or lexicon may not improve recognition. User interface 401 further includes optional character input area 403. Optional character input area 403 may be displayed based on user preference or as designated by a developer. In some instances, users may desire to have more space in which to be able to input information before that information is processed by a recognizer. Further as shown in FIG. 4, user interface 401 includes recognizers Recog 1 associated with button 404, Recog 2 associated with button 405, and Recog 3 associated with button 406. The user interfaces from FIGS. 3 and 4 may be combined in that the recognition engine 406 whose button is shown highlighted in user interface 401 may be the same as Recog 3 from FIG. 3. Accordingly, selecting a different recognizer may or may not change the handwriting input area associated with the user interface 401.

Figure 5:
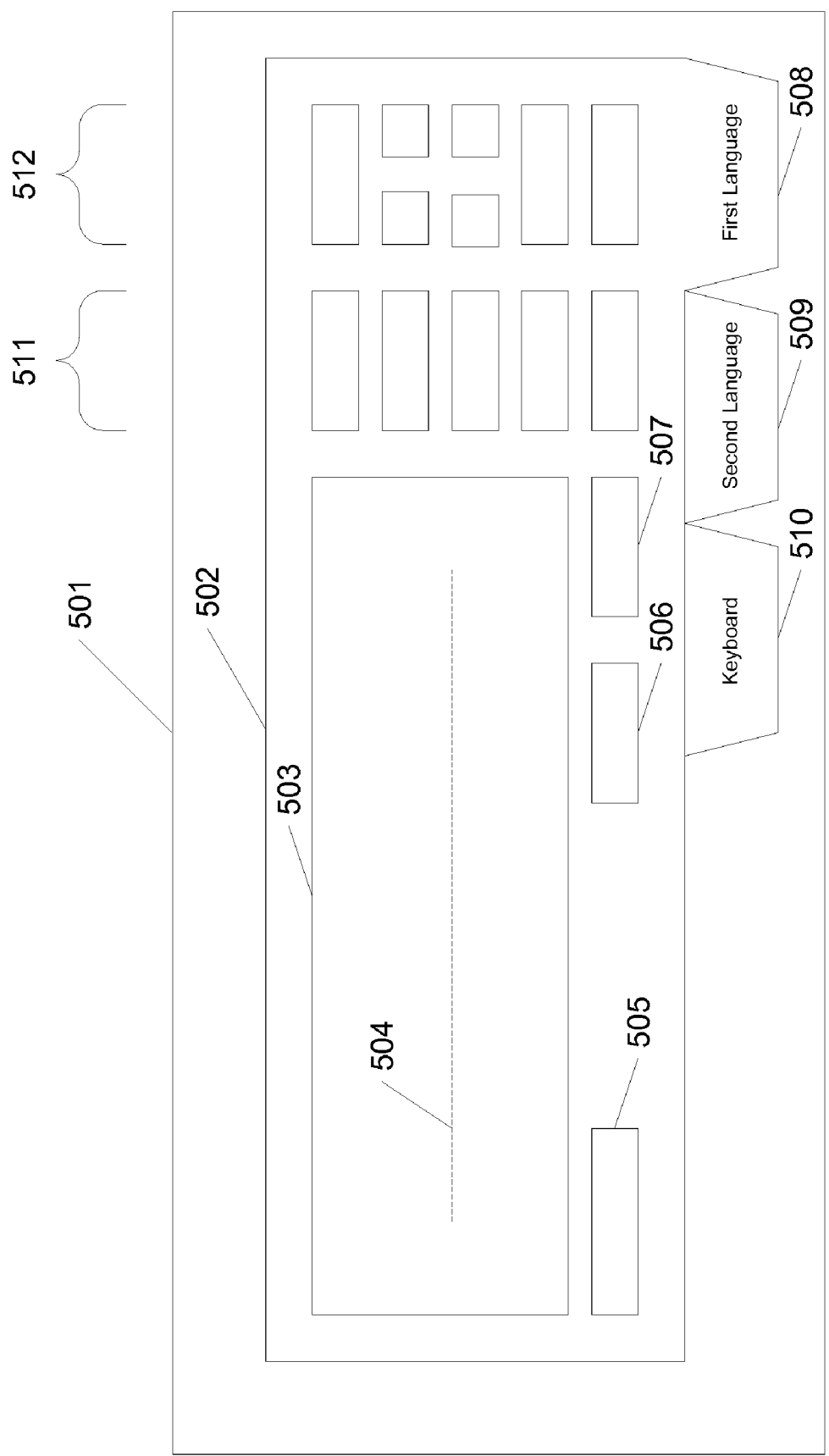
FIG. 5 shows a third user interface for selecting among multiple handwriting recognition engines in accordance with embodiments of the present invention.

FIG. 5 shows a third user interface for selecting among multiple handwriting recognition engines in accordance with embodiments of the present invention. FIG. 5 shows user interface 501 having more features on the user interface than present in the user interfaces of FIGS. 3 and 4. User interface 501 includes region 502, which further includes tabs 508, 509, and 510. Each of these tabs relate to a different recognizer and/or display that may be provided to a user. For example, tab 508 entitled "first language" relates to a user writing in a first language. When writing in this first language, a recognizer associated with the first language may be associated with the received ink. Electronic ink may be received in handwriting input area 503. Line 504 may also be provided to assist the user in writing neatly. FIG. 5 further may include additional buttons 505-507 and 511-512 in order to provide additional options for the user. These buttons may include, but are not limited to, the following possible functions: escape, tab, delete, back space, space, enter, home, right click, arrow directions (up, down, left, right), rewrite, and send. Of course, more or less or additional functions may be added to these keys.

Tabs 508 and 509 relate to other languages/recognizers that may be associated with ink received in user input area 503. Various actions may be associated with selection of the tabs (or other clickable regions). For example, upon selection of tabs 508 or 509, the display may change to accommodate a new handwriting input area, which may or may not result in a change in displayed options in the same or different language. For instance, the new handwriting input area may be a boxed input area (with one or more lines of input boxes) or may be an input as shown in FIGS. 3 and 5 with one or more lines of input area. Upon selection of the various tabs or clickable regions, the system may associate a new recognizer with ink about to be inputted. Ink input may be associated with the recognizer associated with the currently selected clickable region (for example one of tabs 508-510). Upon selection of a new clickable region, a new recognizer may be associated with received ink.

Further, as shown by tab 510, a keyboard may be provided to the user as well. As with other aspects of the present invention, this keyboard may be modified to match a currently selected language.

Processes for switching between and applying selected multiple handwriting recognition engines FIG. 6 shows a process for handling electronic ink and multiple recognizers in accordance with embodiments of the present invention. In step 601, electronic ink is received. In step 604, the system determines a selected recognizer to be associated with received ink from step 601. Next, in step 605, the ink is sent to the recognizer. In step 606, the system receives recognized text. Next in step 607, the system sends the recognized text to another application. This application may be a document or form or spreadsheet or the like, previously accessed before ink was placed in the handwriting input areas of FIGS. 3-5.

Subsequent steps 608-610 may be optionally performed as they may or may not occur. In step 608, the system may additionally send the original handwritten ink from step 601 to the other application as referenced in step 607. In step 609, the other application may perform an alternative recognition on the original ink received from step 608. So, for example, if another recognizer was later added to the set of recognizers available to a user, step 609 may provide better results of the user's handwritten ink as the user may have been writing in a different language than the previously unavailable recognizers. Another example would be to try and recognize non-text content of the ink (gestures, shapes, etc.). In step 610, the system may maintain the original ink and/or the recognized text for later processing and/or input in two different documents.

FIG. 7 shows a process for switching between recognizers in accordance with embodiments of the present invention. In step 701, the system receives a change in recognizer as designated by a user. In step 703, the system switches to the new recognizer. In step 704, the system determines if a new handwriting input area is associated with the new recognizer. If no, the system then waits for new ink in step 705. If yes, from step 704, the system then switches the display to the new handwriting input area in step 706 then proceeds to step 705.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A user interface for a computer comprising:
   a handwriting input area operable to receive handwriting input from a user as electronic ink;
   at least a first selection region and a second selection region relating to at least a first handwriting recognizer and a second handwriting recognizer, respectively,
   wherein user selection of the first selection region associates the electronic ink with the first handwriting recognizer and wherein user selection of the second selection region associates the electronic ink with the second handwriting recognizer,
   wherein the first handwriting recognizer recognizes a first language and the second handwriting recognizer recognizes a second language.

2. The user interface according to claim 1, wherein the at least first selection region and second selection region correspond to user-selectable interface buttons.

3. The user interface according to claim 2, wherein user selection of one of said interface buttons is operable to change a handwriting input area format to a format associated with the selected interface button.

4. The user interface according to claim 3, wherein the handwriting input area format corresponds an input area comprising at least one of: a blank space for receiving handwriting input; a baseline handwriting guide; and a multiple block input area comprising a plurality of input regions for individual character input.

5. The user interface according to claim 4, wherein, upon selection of the keyboard interface tab, the keyboard input interface is associated with a language of the handwriting recognizer associated with the electronic ink at the time of the selection of the keyboard interface tab.

6. The user interface according to claim 1, wherein the at least first selection region and second selection region correspond to at least first and second user-selectable interface tabs, respectively.

7. The user interface according to claim 6, wherein user selection of one of the user-selectable interface tabs causes the user interface to switch between a plurality of interface screens each associated with each of the user-selectable interface tabs, respectively, wherein the handwriting input area is an area corresponding to each of the plurality of interface screens.

8. The user interface according to claim 7, wherein at least one of the plurality of interface screens further comprises additional selection regions corresponding to user input functions.

9. The user interface according to claim 7, wherein each of said plurality of interface screens is associated with a handwriting input area format.

10. The user interface according to claim 9, wherein the handwriting input area format corresponds an input area comprising at least one of: a blank space for receiving handwriting input; a baseline handwriting guide; and a multiple block input area comprising a plurality of input regions for individual character input.

11. The user interface according to claim 7, further comprising a user-selectable keyboard interface tab and a keyboard interface screen comprising a keyboard input interface and associated with the keyboard interface tab, said user interface switching to the keyboard interface screen upon selection of the keyboard interface tab.

12. The user interface according to claim 1, wherein the handwriting input area includes a baseline guide.

13. The user interface according to claim 1, wherein the handwriting input area includes multiple block input regions for individual character input.

14. The user interface according to claim 1, further comprising:
a third selection region that, upon selection, displays a keyboard input interface.

15. The user interface according to claim 14, wherein, upon selection of the third selection region, the keyboard input interface is associated with a language of the handwriting recognizer associated with the electronic ink at the time of the selection of the third selection region.

16. The user interface of claim 1, wherein the at least first selection region and second selection region are separate from the handwriting input area.

* * * * *